(12) United States Patent
Lu et al.

(10) Patent No.: US 9,674,052 B2
(45) Date of Patent: Jun. 6, 2017

(54) DATA PACKET STREAM FINGERPRINT

(71) Applicant: Hewlett Packard Enterprise Development LP, Houston, TX (US)

(72) Inventors: Wei Lu, Austin, TX (US); Blaine Kubesh, Austin, TX (US); Jianhua Xie, Austin, TX (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 904 days.

(21) Appl. No.: 13/623,335

(22) Filed: Sep. 20, 2012

(65) Prior Publication Data
US 2014/0078913 A1 Mar. 20, 2014

(51) Int. Cl.
*H04L 12/26* (2006.01)
(52) U.S. Cl.
CPC .................. *H04L 43/028* (2013.01)
(58) Field of Classification Search
None
See application file for complete search history.

(56) References Cited

U.S. PATENT DOCUMENTS

| | | | |
|---|---|---|---|
| 6,148,336 A * | 11/2000 | Thomas et al. | 709/224 |
| 6,816,455 B2 * | 11/2004 | Goldberg et al. | 370/230 |
| 7,711,564 B2 | 5/2010 | Levy et al. | |
| 7,930,546 B2 | 4/2011 | Rhoads et al. | |
| 8,077,911 B2 | 12/2011 | Brunk et al. | |
| 8,631,106 B2 * | 1/2014 | Huang et al. | 709/223 |
| 8,645,543 B2 * | 2/2014 | Baker et al. | 709/226 |
| 2002/0126872 A1 | 9/2002 | Brunk et al. | |
| 2003/0009588 A1 * | 1/2003 | Bodlaender | 709/238 |
| 2003/0097595 A1 * | 5/2003 | Partridge et al. | 713/201 |
| 2006/0168281 A1 * | 7/2006 | Starr et al. | 709/230 |
| 2010/0292994 A1 | 11/2010 | Lee et al. | |

OTHER PUBLICATIONS

Fenet, S. et al; A Scalable Audio Fingerprint Method with Robustness to Pitch-shifting; http://ismir2011.ismir.net/papers/PS1-14.pdf > on pp. 121-126; Oct. 2011 ; c 2011 International Society for Music Information Retrieval.

* cited by examiner

*Primary Examiner* — Alex Skripnikov
(74) *Attorney, Agent, or Firm* — Hewlett Packard Enterprise Patent Department

(57) ABSTRACT

Techniques for identifying stream fingerprints are provided. A stream of data packets may be received. In one aspect, a stream fingerprint may be determined based on the stream of data packets. An application associated with the stream may be determined based on the stream fingerprint. In another aspect, a stream may be partially matched while a fully matched stream fingerprint has not been determined. As additional packets are received, the stream may become fully matched.

20 Claims, 8 Drawing Sheets

DATA PACKET STREAM FINGERPRINT

BACKGROUND

Today's computing networks carry vast amounts of data traffic. This traffic may be associated with applications that use specific data protocols for communications. For example, web browser applications use the Hyper Text Transfer Protocol (HTTP), while a telnet application uses the telnet protocol. The number of applications and their associated protocols is ever increasing, as more and more capabilities become available on computing networks.

In order to manage the traffic on the network, network operators typically require an understanding of the nature of the traffic that is traversing the network. For example, the network operator may wish to determine which applications are using inordinate amounts of the network bandwidth, such that the bandwidth utilized by those applications can be managed. A first step in understanding the nature of the traffic on the network is identification of the applications and their associated protocols that are using the network.

One mechanism for identifying the traffic on the network is to examine the packet headers of the data packets that are traversing the network. For example, HTTP traffic typically uses the well known port 80. A network operator may monitor the data packets traversing the network destined for port 80 and consider that traffic to be HTTP traffic. Many other common applications use a well known port and can be identified through that well known port.

Another mechanism that may be used to identify applications and their associated protocols is the use of an application decoder. An application decoder is essentially a piece of software or hardware that is programmed to behave just as the application would. For example, a stream of data packets could be sent to an HTTP application decoder. The decoder would monitor the contents of the received packets, and if those packets matched the HTTP protocol, it could be determined that the stream of data packets is web traffic. If the contents of the data packets do not match the HTTP protocol, then the traffic is some other type of traffic.

DETAILED DESCRIPTION

Figure 1:
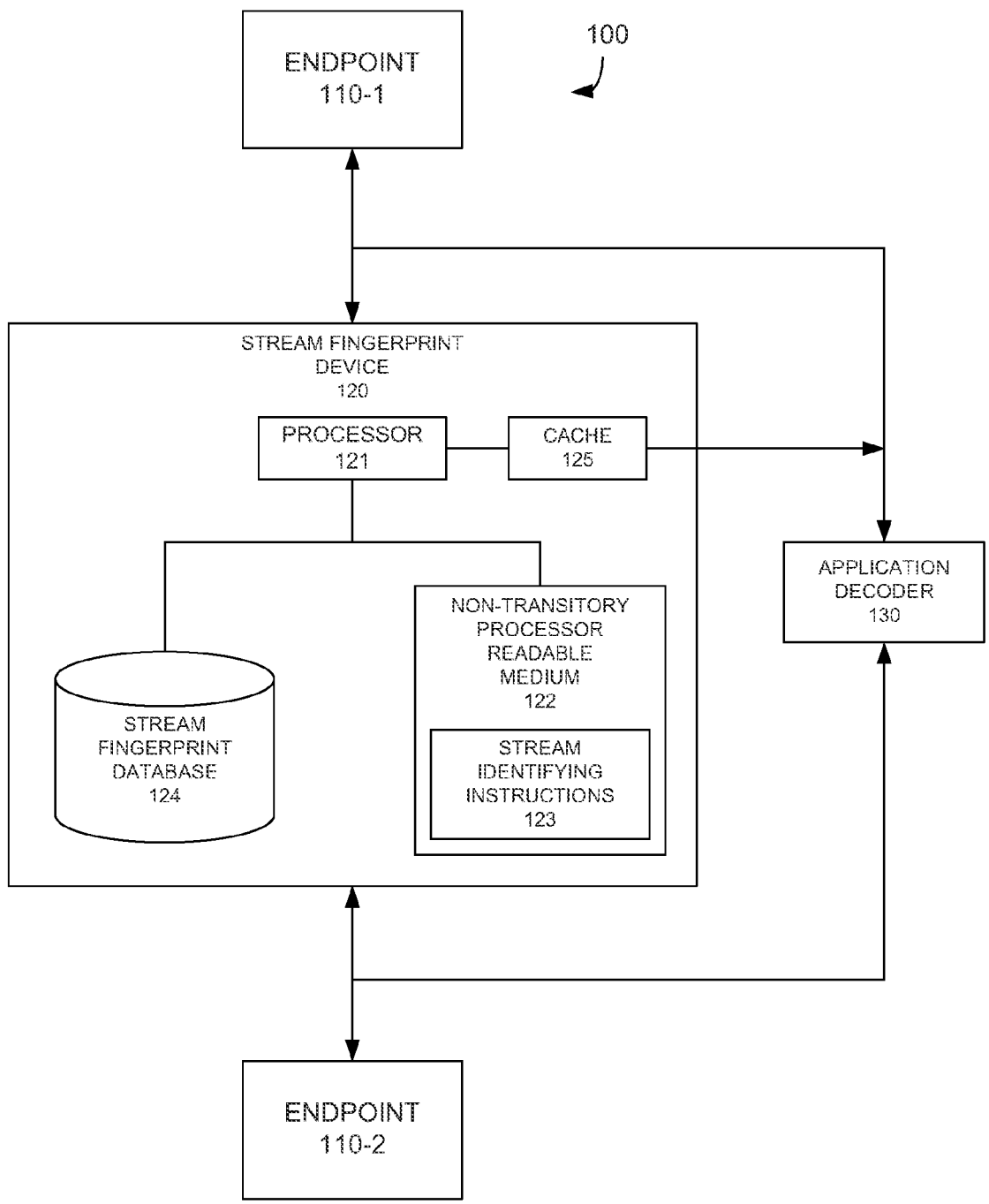
FIG. 1 depicts an example of a system operable in accordance with the techniques described herein.

The techniques described above for identifying network traffic suffer from several problems. For example, the use of well known ports to identify the type of traffic suffers from several shortcomings. First, in order for the mechanism to work, the application must consistently use a well known port. In the case of well known protocols, such as HTTP, this may not be a problem, as port 80 is typically used. However, many applications exist that do not use a well known port. In some cases, the applications may use a different port for every connection. For these applications, identifying the application through the port used is not possible.

Furthermore, the well known port mechanism is based on the assumption that a stream of data packets using the well known port is actually using the protocol associated with the well known port. A malicious application may use this assumption to mask nefarious activities. For example, an illicit file sharing application could be configured to use the well known port for HTTP, even though the application is not related to web browsing. The network administrator would not be able to identify this traffic as not being web traffic if only the port number is used. In general, mechanisms that rely on well known ports suffer from the ability to accurately identify all types of traffic.

Applications decoders on the other hand may not use well known ports to identify traffic. Rather, the stream of data packets is intercepted and sent to the application decoder. In the case of applications decoders, it is necessary to have an application decoder for every possible application. Thus, it is extremely difficult to keep adding new application decoders each time a new application is developed. In order to identify a stream of data packets, the stream must be sent to an application decoder for every possible application, even though it will match only one application. Thus, if there are one hundred different applications running on the network, each stream would need to be sent to one hundred different application decoders. The problem is exacerbated by the fact that there may be hundreds or thousands of different streams of data packets. The processing burden for applying multiple application decoders to all of the streams may become unsustainable.

The techniques described herein overcome the above problems through the use of a stream fingerprint. For every possible application, the characteristics of a stream of data packets using the protocol of the application are maintained. Some example characteristics can include which endpoint of the stream of data packets initiated the connection, which endpoint was the first endpoint to send an application message, and the content of the data packets. This collection of characteristics may be referred to as a stream fingerprint of an application and can identify a stream using the protocol associated with the application. The stream fingerprint for each application may be stored in a stream fingerprint database.

When a new stream of data packets is started, the stream may be sent to a stream fingerprint device. The stream fingerprint device may evaluate the characteristics of the stream and compare them to the stream fingerprints stored in the database, to determine which fingerprints match the stream of data packets, which can also be referred to as the stream. Once the fingerprint completely matches a single fingerprint stored in the database, the application is identified.

In some cases, as a stream is being received, it may partially match more than one fingerprint. As additional data packets are received, some of the partially matched fingerprints may no longer match, and can be eliminated from consideration. Once only a single matching fingerprint remains, the application may be determined. In some cases, the stream may not match any stored fingerprints. In such cases, the network administrator may be made aware that there is a new application that was not previously known. As new applications are added, the stream fingerprint database may be updated to include the stream fingerprints of the new applications.

The techniques, which are described in further detail below and in conjunction with the appended figures, overcome the problems of the previously described techniques. For example, the stream fingerprints are not based on any particular port used by an application. Thus applications that do not use a well known port or that are using a well known port for a non-standard purpose may still be identified. Furthermore, the processing requirements for running multiple application decoders for every stream are eliminated. A single stream fingerprinting process may be applied to each stream, regardless of the number of possible applications.

FIG. 1 depicts an example of a system operable in accordance with the techniques described herein. The system 100 may include endpoints 110-1,2, a stream fingerprint device 120, and an application decoder 130. The endpoints may be connected to each other via a network (not shown). The stream fingerprint device may be included as part of the network.

The endpoints 110-1,2 may be any type of computing device. For example, the endpoints may be personal computers, servers, mainframes, or any other type of traditional computing device. The endpoints may also be non-traditional computing devices, such as cell phones, tablets, personal digital assistants, or any other type of non-traditional computing device. What should be understood is that the techniques described herein are applicable for use with any devices that are capable of communicating over a network. The particular form of the device is unimportant.

For ease of description, only two endpoints are shown. However, it should be understood that there may be any number of endpoints. The two endpoints may communicate over the network by exchanging data packets. The data packets may include header information, such as an IP address, a port number, and other information used to route the data packets from one endpoint to the other over the network. In addition, the data packets may include a payload. The payload information is the information that is to be exchanged between applications running on the endpoints. The collection of data packets flowing between the endpoints may be referred to as a stream.

For example, endpoint 110-1 may be a personal computer that is running a web browser application. Endpoint 110-2 may be a web server that is running web server software. The data packets between the two endpoints may be routed over the network using the header information in the data packets. The network itself is not concerned with the particular application, as this information is not needed for proper routing of the data packets. The data packet payload may contain data that is specific to the application. In this example, the data packet payload will contain the information necessary for the web browser to request web pages and the web server to send those web pages to the web browser.

Stream fingerprint device 120 may include a processor 121, a non-transitory processor readable medium 122 which contains stream identifying instructions 123, a stream fingerprint database 124, and a cache 125. The stream fingerprint device may be a standalone piece of hardware that provides the functionality described herein. In other embodiments, the stream fingerprint device may be incorporated into another device, such as a switch or router. In yet other embodiments, the stream fingerprint device may be a general purpose computer programmed to implement the techniques described herein.

The processor 121 may be any type of processor that is capable of executing instructions to implement the functionality described herein. Coupled to the processor may be a non-transitory processor readable medium 122. The medium may contain a set of stream identifying instructions 123, which when executed by the processor cause the processor to implement the techniques described herein. The operation of the stream identifying instructions is described in further detail below.

Also coupled to the processor may be a stream fingerprint database 124. The stream fingerprint database may maintain stream fingerprints for all known applications. As additional applications are identified and their fingerprints determined, the fingerprints may be added to the stream fingerprint database. The processor may also be coupled to a cache 125. The cache may be used to temporarily store data packets while a stream is in the process of being identified. As mentioned above, it is possible that a stream may initially match more than one fingerprint, and as such is only partially matched. As additional packets are received, the identification of the stream may occur by eliminating those fingerprints that no longer match. Packets that are received, but are associated with a stream that is only partially matched may be stored in a cache until such time as the stream is fully matched. Use of the cache will be described in further detail below.

The application decoder 130 may be used once a stream has been identified to extract application level content from the stream. As mentioned above, an application decoder is associated with a single application. Once the application has been identified through the stream fingerprint, selecting the appropriate application decoder becomes trivial. The application decoder may be used to extract application level data from the stream.

In operation, the endpoint 110-1 may initiate a connection over the network to endpoint 110-2. The stream fingerprint device 120 may record which endpoint initiated the connection. The two endpoints may then begin communicating application level data by exchanging data packets. As each data packet is received, the stream fingerprint device may attempt to match the stream fingerprint to a fingerprint stored in the stream fingerprint database 124. Until the stream is fully identified, a copy of the data packets may be stored in the cache 125. It should be noted that the stream fingerprint device only examines the contents of the data packets, and does not prevent the flow of data packets between the two endpoints. Thus, the use of the stream fingerprint device does not impact the application level communication between the endpoints.

Once the stream of data packets fully matches a single stream fingerprint, the application protocol in use between the two endpoints has been identified. In some cases, such as when an application protocol for which no fingerprint exists, the stream will never match any fingerprint stored in the stream fingerprint database. Such streams may be referred to as unmatched streams. In some embodiments, the stream fingerprint device may determine that a stream is unmatched once all possibilities of a match in the stream fingerprint database have been exhausted.

Once the application protocol has been determined, the stream may be sent to an application decoder to extract application level content. As mentioned above, during the period of time when a stream is only partially matched, the data packets are stored in the cache. If it is desired to send the stream to an application decoder, the data packets from the cache may be sent first, such that the application decoder is made aware of the full sequence of data packets sent between the endpoints. Once the cache has been emptied, the data packets flowing between the endpoints may be sent directly to the application decoder. Again, it should be noted that all of the processing described above occurs in parallel with the data packets being sent between the endpoints. Thus, the processing does not have an impact on the communications between the endpoints.

Figure 2:
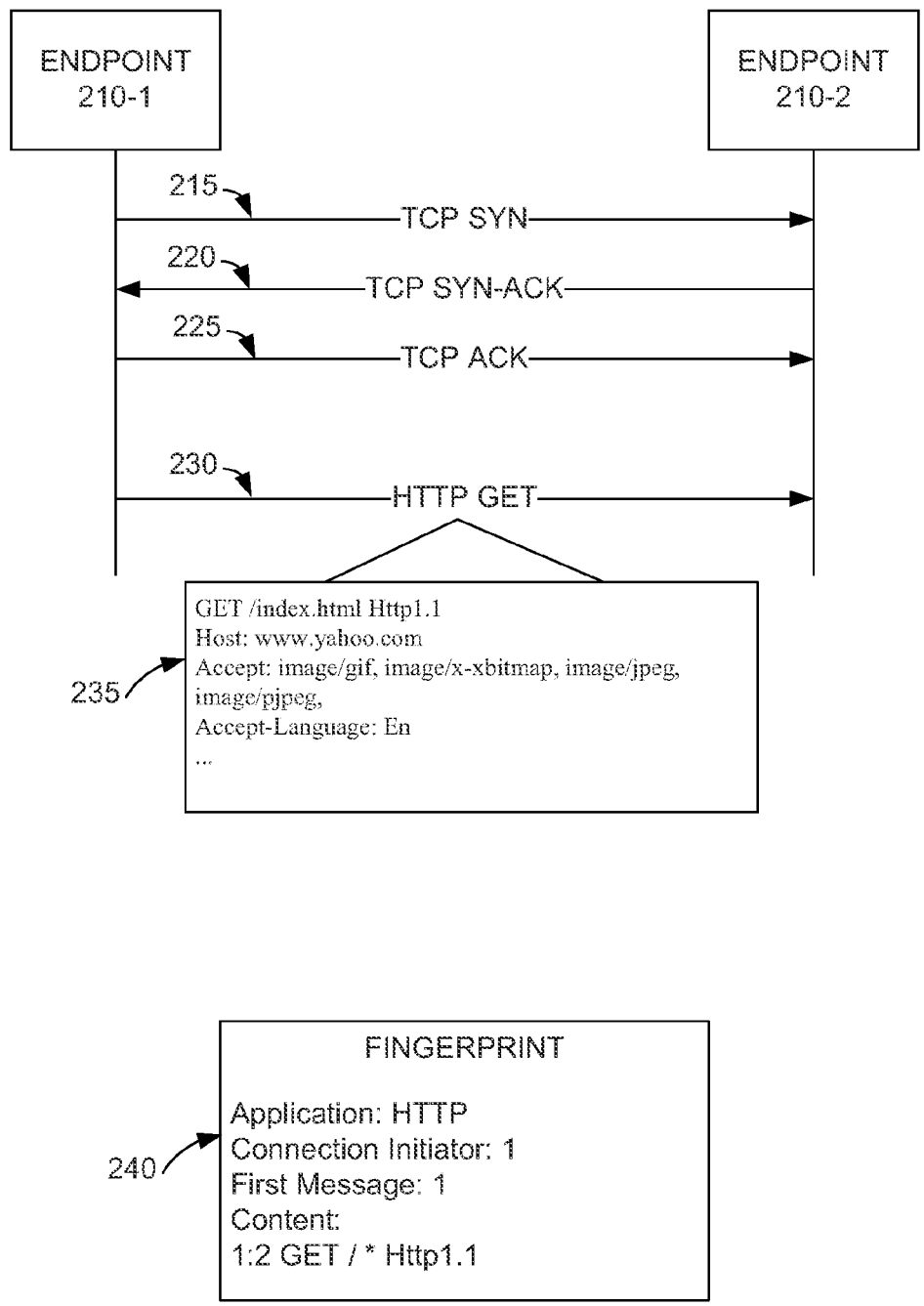
FIG. 2 depicts an example of an application protocol and corresponding fingerprint.

FIG. 2 depicts an example of an application protocol and corresponding fingerprint. For purposes of this description, FIG. 2, depicts a simplified version of the HTTP protocol. However, nothing in this description is limited to any particular protocol, and the techniques described herein are applicable to all possible protocols. The HTTP protocol typically begins with the establishment of a TCP connection between the two endpoints. Establishment of a TCP connection involves the endpoint 210-1 initiating the connection sending a TCP SYN 215 packet to the other endpoint 210-2. The endpoint 210-2 then responds with a TCP SYN-ACK 220 acknowledging the connection request. The endpoint 210-1 responds to the TCP SYN-ACK by sending a TCP ACK 225 to acknowledge the establishment of the connection. During this process, the stream fingerprint device may make note that endpoint 210-1 is the endpoint that established the connection.

In the simplified HTTP protocol being described, once the TCP connection has been established, the endpoint that is requesting the web page sends a HTTP GET 230 message to the other endpoint. The content of the HTTP GET message is conveyed in the payload of a data packet. A truncated example of the content 235 in the payload of the data packet is shown. As shown, the first three characters of the content field are the letter GET. This is followed by a space and then a file location and name, indicated as /index.html. Following the file indication is the version of the protocol, which as shown is Http1.1.

FIG. 2 also depicts an example of a stream fingerprint 240 for the simplified HTTP protocol described above. The fingerprint may include some identification information. Here, for example, the fingerprint includes an identification of the application, which is HTTP. Next, the fingerprint may include an identification of the endpoint that was the connection initiator. In the current example, the connection initiator is endpoint 210-1. The stream fingerprint may also include an identification of which endpoint sent the first application level message once the connection has been established. As shown here, the HTTP GET message, which is the first application level message, was sent by the endpoint 210-1.

In operation, the stream fingerprint device may monitor the communications between the endpoints. Once the connection has been established, and the first application level message sent, the stream fingerprint device can compare the stream fingerprint received thus far to those stored in the stream finger print database. In the present example, the connection initiator 210-1 is also the entity that sent the first application level message. Thus, all fingerprints in the database in which the connection initiator does not also send the first application message can be eliminated. Assuming that there is more than one fingerprint in the database in which the connection initiator also sends the first application level message, the stream is now partially matched, in that it matches all such fingerprints.

The stream fingerprint device may then examine the contents of the payload of the data packet. As mentioned above, in the simplified HTTP protocol being described, the first characters transmitted from the connection initiator are the letters GET. This is followed by a file identification that starts with a /. After the file identification is the protocol version. In the fingerprint shown in FIG. 2, it is shown that the first application level message is a message from endpoint 210-1 to endpoint 210-2, as depicted by the 1:2. The fingerprint shows that the contents of the data packet payload begin with the characters "GET /". As explained above, the next item in the payload is a file name and location. As is known, file names and locations can be of variable length. In the fingerprint, this is depicted by the asterisk character, which is a wildcard indicating a variable number of characters. This is then followed by the protocol version Http1.1.

The stream fingerprint device may compare the contents of the data packet 235 to all fingerprints stored in the database. As fingerprints are eliminated, they can be removed from possible identification as the application being used. Continuing with the example, the stream fingerprint device has now eliminated all fingerprints for which the connection initiator does not also send the first application level message. Next, the stream fingerprint device can eliminate all fingerprints for which the first characters in the payload are not "GET /". The stream fingerprint device may then scan the next characters in the payload to determine if the protocol revision "Http1.1" is present. Once this match has occurred (assuming that no other fingerprints match this particular payload), the application can be identified as the HTTP application. A case where more than one fingerprint may match is described in FIG. 3.

Although the preceding description has been presented in terms of data packet payload that is human readable, the techniques described herein are not so limited. In many cases, the payload may not be human readable, but rather is an unreadable sequence of characters or pure binary that may have significance to the application. For example, the payload may consist of data that is encoded and interpreted by the application. The techniques described herein are equally applicable.

Figure 3:
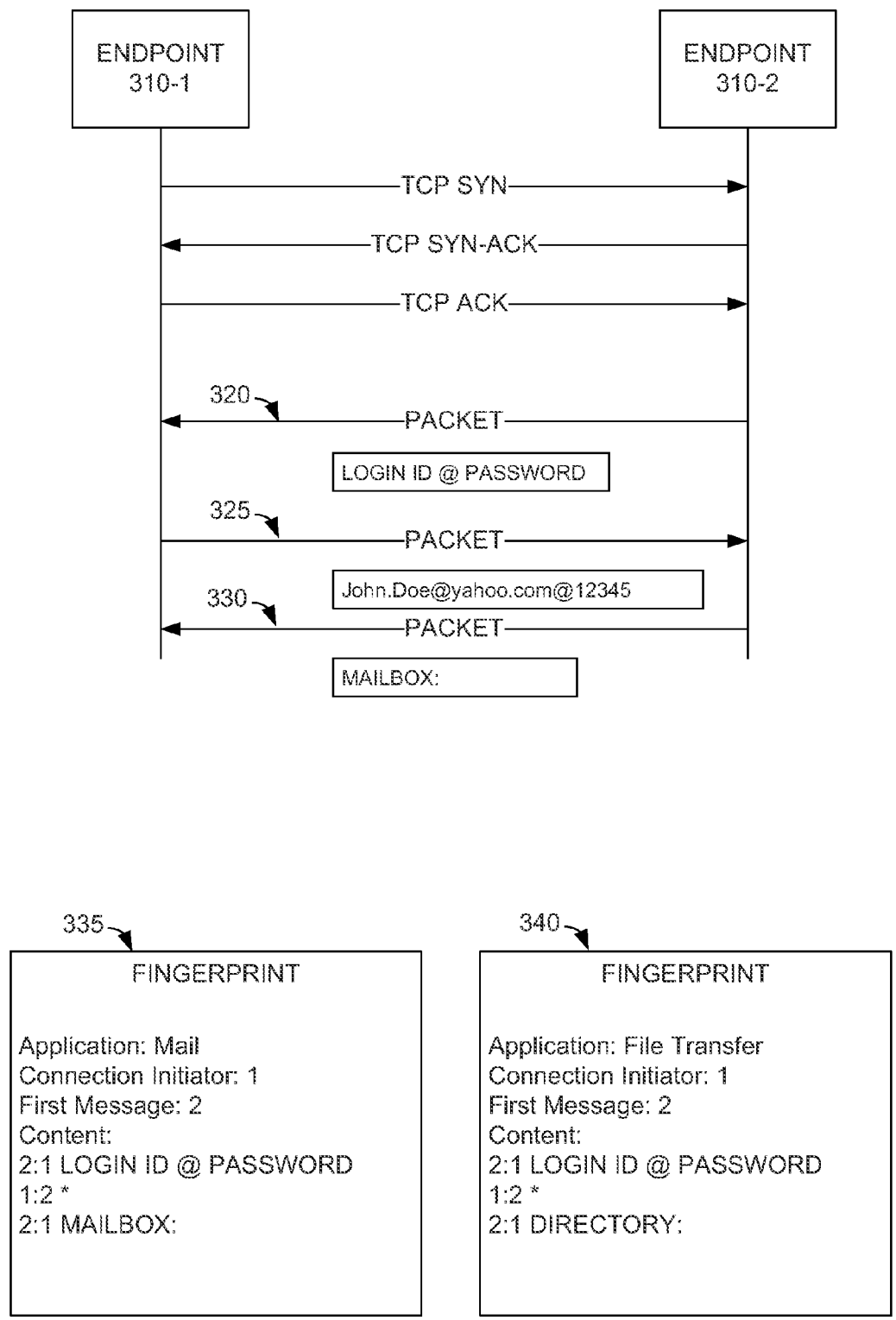
FIG. 3 depicts an example of a stream that matches multiple fingerprints.

FIG. 3 depicts an example of a stream that matches multiple fingerprints. Just as above with respect to FIG. 2, a TCP connection is established between endpoints 310-1 and 310-2. The connection is established by endpoint 310-1 through the standard TCP handshake. In this case, the first application message 320 is sent from endpoint 310-2, which is not the endpoint that initiated the connection. As should be clear, this means that the application cannot be the HTTP application described in FIG. 2, because in that fingerprint, the first communication is by the same endpoint that initiated the communication. In this example, assume that the contents of the payload include the text string "LOGIN ID @ PASSWORD." Again, this is not to imply the payload must be human readable, but rather is for purposes of simplicity of explanation. This text string may prompt the application to ask the user for a user ID and password.

The next communication 325 may be from endpoint 310-1 to endpoint 310-2. This communication may include the user ID and password in some form. The specific form may not be important, as will be described below. The final communication 330 shown may be text that informs the application do prompt the user for a mailbox. Again, the specific contents presented are for purposes of description, not limitation.

FIG. 3 also depicts two additional fingerprints 335 and 340. Just as above, each fingerprint may be associated with an application. Here the applications are Mail and File Transfer respectively. In both cases, the connection initiator is endpoint 1. However, unlike the HTTP example presented above, in both cases, the first application communication is from endpoint 2.

Moving to the content section of the fingerprint, we see that in both cases, the first application message, which goes from endpoint 2:1 is the character sequence "LOGIN ID @ PASSWORD". This is followed by a message from 1:2 whose content is listed as *, indicating a wildcard, or a don't care condition. In other words, an application message is sent from endpoint 1 to endpoint 2, but the contents of that message are irrelevant. Finally, in the case of fingerprint 335 a message is sent from 2:1 with the characters "MAILBOX". In the case of fingerprint 340, the message sent from 2:1 is the character string "DIRECTORY".

In operation, the stream fingerprint device may monitor the stream and determine that the communications channel was initiated by endpoint 310-1. The stream fingerprint device may also see that the first application message was sent by endpoint 310-2. As should be clear, the stream fingerprint described in FIG. 2 can be eliminated from consideration, as in that fingerprint the first communication was from endpoint 1. At this point, the stream received thus far matches both stream fingerprints 335 and 340. Thus, the stream can be considered partially matched, because it matches two or more fingerprints.

The next message 320 is also identical for both fingerprints 335 and 340. As such, the stream fingerprint remains partially matched, because it matches both fingerprints. The next message 325 matches both fingerprints because a message was sent from endpoint 1 to endpoint 2. As shown in the stream fingerprints 335 and 340, the contents of that message are not relevant. However, it should be noted that if the next message had been sent from endpoint 2, then there would not longer be a match to either fingerprint 335 or 340. If this was the case, and there were no other possible matches in the stream fingerprint database, then the stream would be considered unmatched, because no match could be found. This may prompt the network administrator to ensure that the stream fingerprint database has been updated to contain the most recent set of stream fingerprints.

The next message 330 is sent from endpoint 310-2 to endpoint 310-1, and contains the characters "MAILBOX" in the payload. As such, this message only matches fingerprint 335. Assuming that there are no other possible matches in the fingerprint database, then the stream can be considered fully matched and associated with the Mail application.

As mentioned above, in some cases it may be desirable to send the stream to an application decoder once the stream has been identified as belonging to a particular application. However, as shown above, in some cases it may take multiple data packets between the endpoints before the application can be identified based on the fingerprint. If those data packets are discarded, it may be difficult for the application decoder to synchronize with the stream. However, as mentioned above, the stream fingerprint device caches all data packets while a stream is in the process of being identified and is only partially matched. Once the stream is identified, the cached packets can be sent to the application decoder, resulting in no loss of packets.

Furthermore, the stream fingerprint decoder may maintain an offset into the stream where certain data is located. For example, in the case of the HTTP protocol described with respect to FIG. 2, the stream fingerprint device may keep track of the offset in the stream of data packets where the filename is located. This offset may be passed to the application decoder. The application decoder may then use the offset to extract application level content from the stream. In the case of the HTTP protocol example described above, a piece of application level content that may be extracted is the filename of the requested webpage, which would be located at a stream offset identified as occurring just after the text GET. Other applications may have similar application level content that may be extracted.

Figure 4:
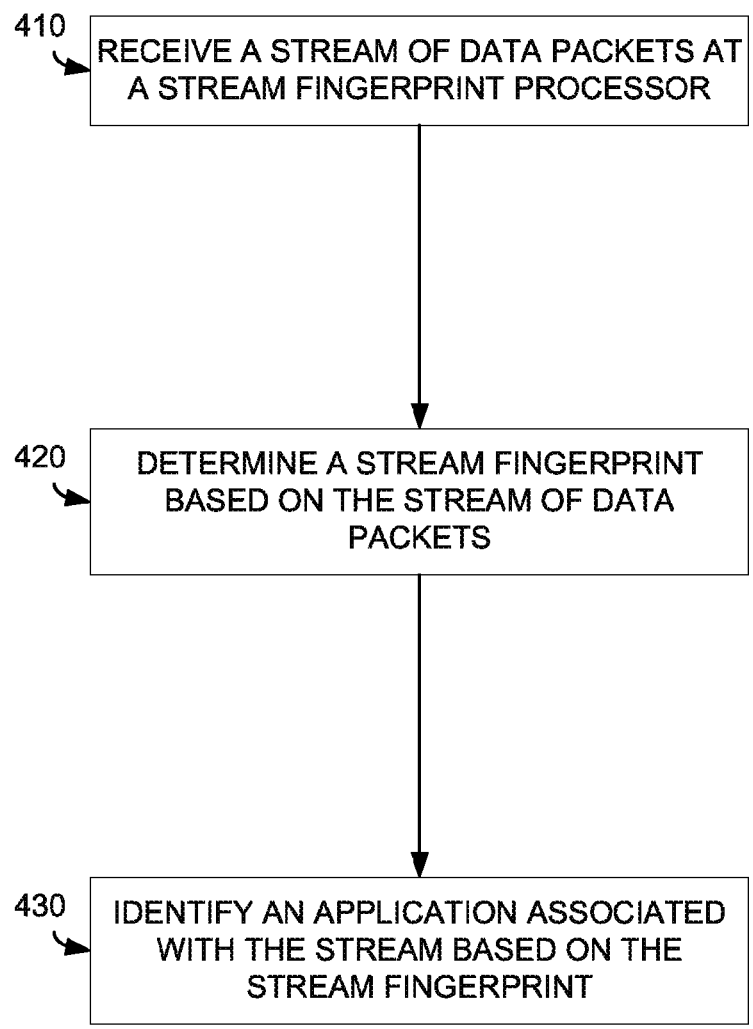
FIG. 4 depicts an example of a flow diagram for identifying a stream fingerprint.

FIG. 4 depicts an example of a flow diagram for identifying a stream fingerprint. In block 410, a stream of data packets may be received at a stream fingerprint processor. The stream fingerprint processor may be the stream fingerprint device described above. In block 420, a stream fingerprint may be determined based on the stream of data packets. The stream fingerprint may be determined based on characteristics of the stream. Some example characteristics can include the endpoint of the stream that initiated the connection, the endpoint that was the first to send an application message, the content of the application messages, the direction of messages (e.g. 1:2 or 2:1), sequence of messages (e.g. 1:2 followed by 2:1 followed by 1:2), the size of the message (including wildcards), and the pattern of messages.

In block 430, an application associated with the stream may be determined based on the stream fingerprint. As described above, each application may be associated with a particular fingerprint. Once a stream is determined to match a particular fingerprint, the stream may be identified as belonging to the associated application.

Figure 5:
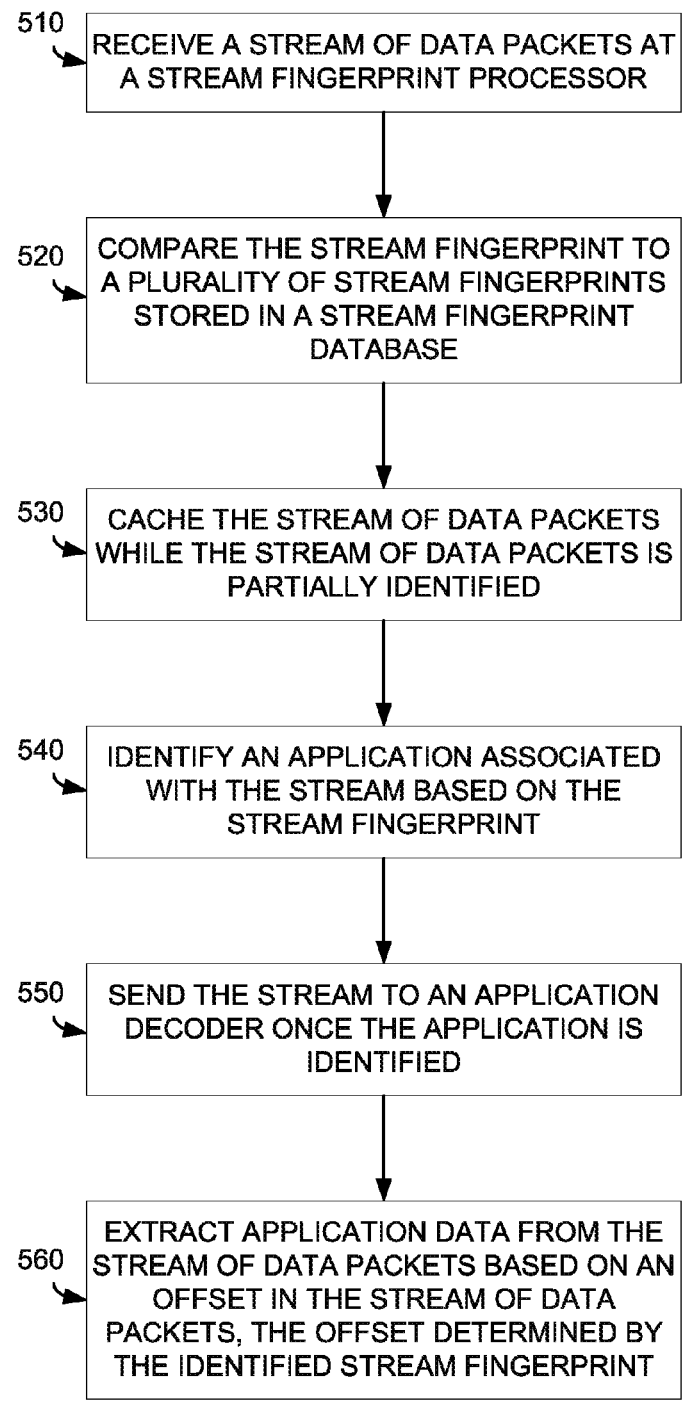
FIG. 5 depicts an example of a flow diagram for identifying a stream and sending to an application decoder.

FIG. 5 depicts an example of a flow diagram for identifying a stream and sending to an application decoder. In block 510, a stream of data packets may again be received at a stream fingerprint processor. In block 520, the stream fingerprint may be compared to a plurality of stream fingerprints stored in a stream fingerprint database. As explained above, stream fingerprints are stored in the database. As new applications are created and fingerprinted, the updated fingerprints may be stored in the database. Thus, identifying new applications is simply a matter of adding the associated stream fingerprint to the database.

In block 530 the stream of data packets may be cached while the stream of data packets is partially identified. As explained above, it is possible that a stream may match more than one fingerprint while packets are still being received. To avoid losing those packets, the packets may be cached until the stream is identified. In block 540, an application associated with the stream may be determined based on the stream fingerprint.

In block 550, the stream may be sent to an application decoder once the application is identified. As explained above, when the stream is sent to the application decoder, the packets that were previously cached may also be sent to the application decoder. In block 560, application data may be extracted from the stream of data packets based on an offset in the stream of data packets. The offset may be determined by the identified stream fingerprint. In other words, the stream fingerprinting process may provide an offset into the stream where application data of interest is located. The application decoder may use this offset to directly extract the application data that is of interest.

Figure 6:
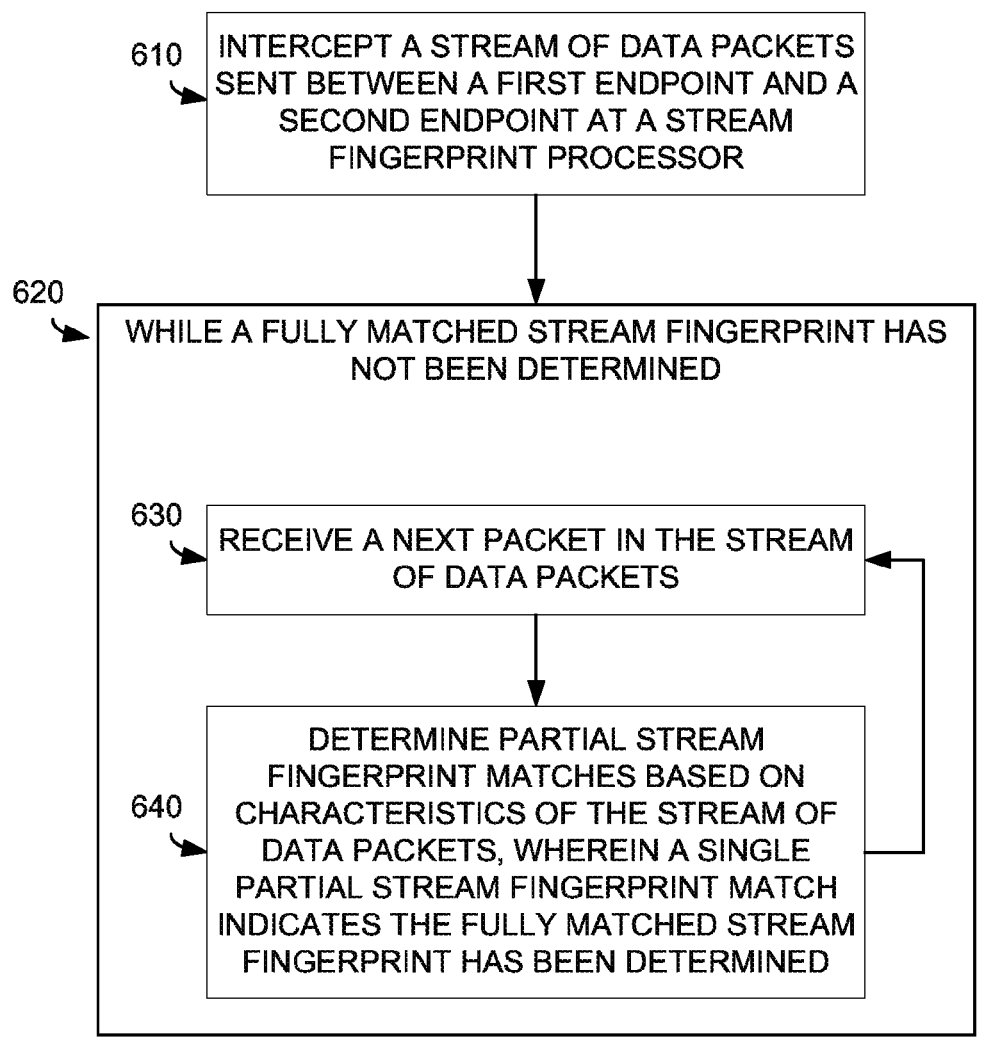
FIG. 6 depicts an example of a flow diagram for partially matching a stream.

FIG. 6 depicts an example of a flow diagram for partially matching a stream. In block 610 a stream of data packets sent between a first endpoint and a second endpoint may be intercepted at a stream fingerprint processor. As explained above, the stream fingerprint processor intercepts the stream of data packets, but it does not block their transmission between the first and second endpoints.

In block 620, the following steps may occur while a fully matched stream fingerprint has not yet been determined. In block 630, a next packet in the stream of data packets may be received. In block 640, partial stream fingerprint matches based on characteristics of the stream of data packets may be determined. A match of a single partial stream fingerprint may indicate that the fully matched stream fingerprint has been determined. In other words, the stream fingerprint processor continues to attempt to match the stream to a fingerprint until only one fingerprint remains. At that point, the stream fully matches the remaining fingerprint.

Figure 7:
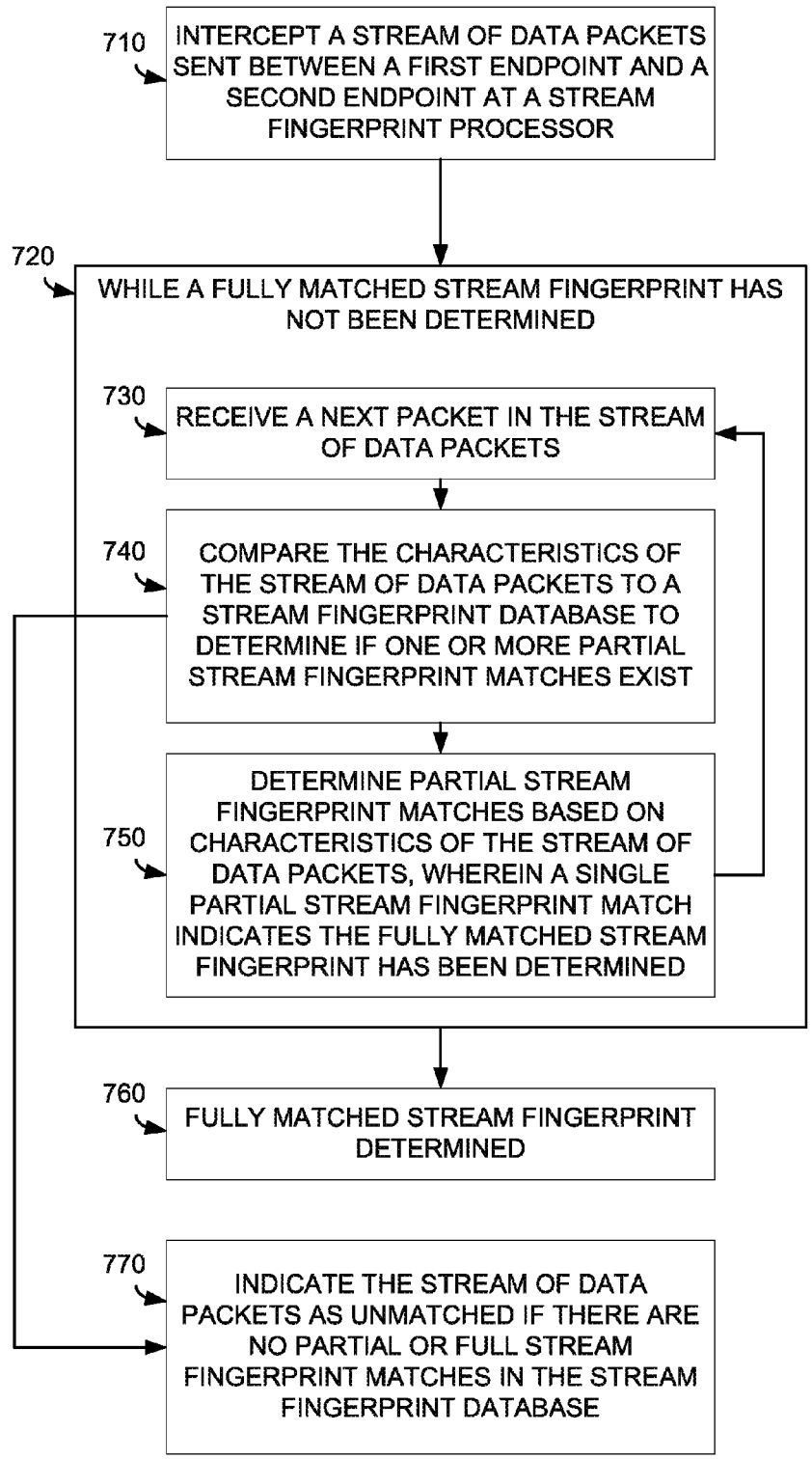
FIG. 7 depicts an example of a flow diagram for identifying a partial, complete, and unmatched stream.

FIG. 7 depicts an example of a flow diagram for identifying a partial, complete, and unmatched stream. In block 710, a stream of data packets between two endpoints is again intercepted. In block 720, the following steps are repeated while a fully matched stream fingerprint has not yet been determined. In block 730, a next packet in the stream of data packets is received. In block 740, the characteristics of the stream of data packets are compared to a stream fingerprint database to determine if one or more partial matches exist. If no partial matches exist, this means that there is stream fingerprint associated with the application associated with the stream. The process moves to block 770, wherein the stream of data packets is indicated as unmatched if there are no partial or full stream fingerprint matches in the stream fingerprint database.

In block 750 partial stream fingerprint matches may be determined based on characteristics of the stream of data packets. A single partial stream fingerprint match indicates that the fully matched stream fingerprint has been determined. If the fully matched stream fingerprint has been determined, the process moves to block 760 wherein it is indicated that the stream is fully matched. If there stream is not yet fully matched, but is partially matched to two or more stream fingerprints, the process returns to block 730, to await additional data packets.

Figure 8:
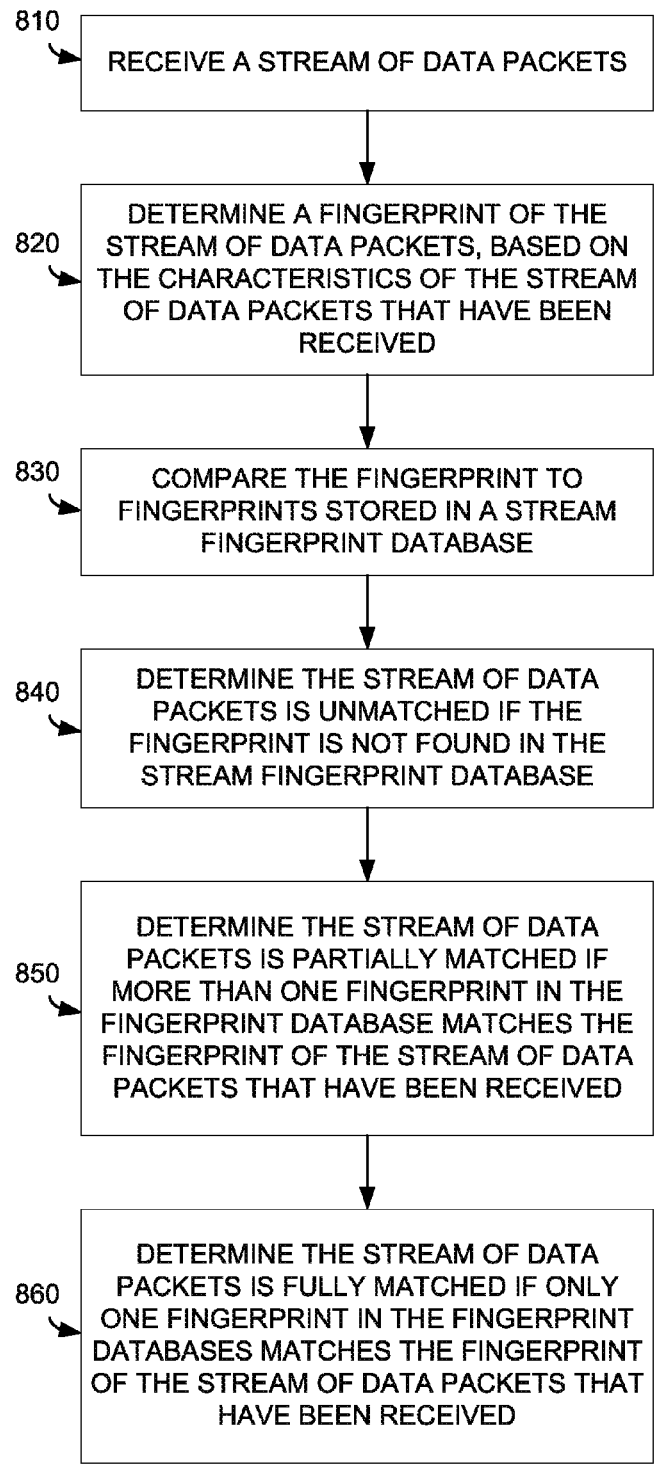
FIG. 8 depicts an example of a flow diagram for identifying a stream.

FIG. 8 depicts an example of a flow diagram for identifying a stream. In block 810, a stream of data packets may be received. In block 820, a fingerprint of the stream of data packets may be determined based on the characteristics of the stream of data packets that have been received. In block 830 the fingerprint may be compared to fingerprints stored in a stream fingerprint database. In block 840, the stream of data packets may be determined to be unmatched if the stream fingerprint is not found in the stream fingerprint database.

In block 850 the stream of data packets may be determined to be partially matched if more than one fingerprint in the fingerprint database matches the fingerprint of the stream of data packets that has been received. In operation, the stream fingerprint processor would continue to receive data packets and further attempt to fully match the stream. In block 860 the stream of data packets may be determined to be fully matched if only one fingerprint in the fingerprint database marches the fingerprint of the stream of data packets that have been received. At this point, the application can be identified. The stream may then be sent to an application decoder for further application level data processing.

We claim:

1. A method comprising:
   receiving a stream of data packets at a stream fingerprint processor;
   determining a stream fingerprint based on characteristics of the stream of data packets, wherein the characteristics of the stream of data packets comprise an identification of an endpoint that was first to send an application level message in the stream of data packets; and
   identifying an application associated with the stream based on the stream fingerprint.

2. The method of claim 1 further comprising:
   sending the stream to an application decoder once the application is identified.

3. The method of claim 1 wherein determining the stream fingerprint further comprises:
   caching the stream of data packets while the stream of data packets is partially identified.

4. The method of claim 1 wherein determining the stream fingerprint further comprises:
   comparing the stream fingerprint to a plurality of stream fingerprints stored in a stream fingerprint database.

5. The method of claim 4 further comprising:
   adding a new stream fingerprint to the stream fingerprint database when a new application is added, wherein the new stream fingerprint identifies the new application.

6. The method of claim 1 wherein determining the stream fingerprint is independent of a port used for the stream.

7. The method of claim 1 further comprising:
   extracting application data from the stream of data packets based on an offset in the stream of data packets, the offset determined by the identified stream fingerprint.

8. The method of claim 1 further comprising:
   while the stream fingerprint has not been fully matched to a stored stream fingerprint:
      receiving a next packet in the stream of data packets; and
      determining partial stream fingerprint matches based on the characteristics of the stream of data packets, wherein a single partial stream fingerprint match indicates the fully matched stream fingerprint has been determined.

9. The method of claim 1, wherein the characteristics of the stream of data packets further comprise an endpoint that initiated a communications channel for the stream of data packets.

10. The method of claim 1, wherein the characteristics of the stream of data packets further comprise a pattern of messages in the stream of data packets.

11. A non transitory processor readable medium containing processor executable instructions thereon which when executed by the processor cause the processor to:
   receive a stream of data packets;
   determine a fingerprint of the stream of data packets based on the characteristics of the stream of data packets that have been received, wherein the characteristics of the stream of data packets comprise an identification of an endpoint that was first to send an application level message in the stream of data packets;
   compare the fingerprint to fingerprints stored in a stream fingerprint database;
   determine the stream of data packets is unmatched if the fingerprint is not found in the stream fingerprint database;
   determine the stream of data packets is partially matched if more than one fingerprint in the fingerprint database matches the fingerprint of the stream of data packets that have been received; and
   determine the stream of data packets is fully matched if only one fingerprint in the fingerprint databases matches the fingerprint of the stream of data packets that have been received.

12. The medium of claim 11 wherein the instructions further cause the processor to:
   execute an application decoder associated with a fully matched stream of data packets.

13. The medium of claim 11 wherein the instructions further cause the processor to determine the fingerprint of the stream of data packets independently of a port used for the stream of data packets.

14. The medium of claim 11 wherein the characteristics of the stream of data packets further comprise an endpoint that initiated a communications channel for the stream of data packets.

15. The medium of claim 11 wherein the characteristics of the stream of data packets further comprise a direction of messages in the stream of data packets.

16. An apparatus comprising:
   at least one hardware processor;
   a storage medium storing instructions that upon execution cause the at least one hardware processor to:
      receive a stream of data packets sent between endpoint devices;
      determine a stream fingerprint based on characteristics of the stream of data packets, wherein the characteristics of the stream of data packets comprise an identification of an endpoint device that was first to send an application level message in the stream of data packets; and
      identify an application associated with the stream of data packets based on the stream fingerprint.

17. The apparatus of claim 16 further comprising:
   a database including a plurality of stored stream fingerprints, wherein the instructions further cause the at least one hardware processor to compare the stream fingerprint to the plurality of stored stream fingerprints.

18. The apparatus of claim 17, wherein the instructions further cause the at least one hardware processor to, while the stream fingerprint has not been fully matched to any of the plurality of stored stream fingerprints:
   receive a next packet in the stream of data packets; and
   determine partial stream fingerprint matches based on comparing the stream fingerprint to the plurality of stored stream fingerprints.

19. The apparatus of claim 16, wherein the characteristics of the stream of data packets further comprise an identification of an endpoint device that initiated a communications channel for the stream of data packets.

20. The apparatus of claim 16, wherein the characteristics of the stream of data packets further comprise sizes of messages in the stream of data packets.

\* \* \* \* \*